(12) United States Patent
Perez Tomas

(10) Patent No.: US 7,841,303 B2
(45) Date of Patent: Nov. 30, 2010

(54) EXTENDIBLE LEAD WITH AN INTEGRATED EXCREMENT COLLECTOR

(76) Inventor: Josep Maria Perez Tomas, Mossen Cinto Verdaguer, No. 19, Sant Antoni de Vi, Barcelona (ES) 08459

( * ) Notice: Subject to any disclaimer, the term of this patent is extended or adjusted under 35 U.S.C. 154(b) by 208 days.

(21) Appl. No.: 12/096,931

(22) PCT Filed: Dec. 28, 2006

(86) PCT No.: PCT/ES2007/000001

§ 371 (c)(1),
(2), (4) Date: Jun. 23, 2008

(87) PCT Pub. No.: WO2007/088222

PCT Pub. Date: Aug. 9, 2007

(65) Prior Publication Data

US 2008/0276883 A1    Nov. 13, 2008

(30) Foreign Application Priority Data

Dec. 30, 2005  (ES) ............................. 200502856 U

(51) Int. Cl.
*A01K 27/00*  (2006.01)
(52) U.S. Cl. ............... 119/796; 119/803; 119/867; 294/1.4
(58) Field of Classification Search ................. 119/867, 119/868, 794–798, 792, 803, 804; 294/1.3–1.5
See application file for complete search history.

(56) References Cited

U.S. PATENT DOCUMENTS

| 4,146,260 | A | * | 3/1979 | Carrington ................. 294/1.5 |
| 5,174,620 | A | * | 12/1992 | Huegelmeyer et al. ....... 294/1.3 |
| 6,554,335 | B1 | * | 4/2003 | Kelly et al. .................. 294/15 |
| 2009/0261604 | A1 | * | 10/2009 | Rodriguez et al. ........... 294/1.3 |

FOREIGN PATENT DOCUMENTS

| DE | 29800977 | * | 5/1999 |
| WO | WO9313268 | * | 7/1993 |

\* cited by examiner

*Primary Examiner*—Rob Swiatek
*Assistant Examiner*—Kristen C Hayes
(74) *Attorney, Agent, or Firm*—Sturm & Fix LLP

(57) ABSTRACT

An extendible lead with an integrated excrement collector, with the lead including a casing with a collection drum. The excrement collector includes a tubular body having telescopic sections and having a flexible wire inside. One end of the wire is disposed in an opening of the tubular body and forms a lasso. A second end of the wire extends through the tubular body and out of the other end of the body and is connected to a handle.

3 Claims, 3 Drawing Sheets

EXTENDIBLE LEAD WITH AN INTEGRATED EXCREMENT COLLECTOR

AIM OF THE INVENTION

The present invention refers to an extendible lead with an integrated excrement collector.

BACKGROUND TO THE INVENTION

Nowadays the municipal regulations in regard to health and healthiness and the awareness of the owners and carers of dogs means that there is an ever lessening amount of canine excrements produced when the said animals defecate in the streets when going for walks with their owners.

The removal of said excrements is carried out in differing manners, the most usual being manual removal.

Hence, the owner covers his/her hand with a bag, with which the excrement on the ground is picked up without directly touching it.

Subsequently the owner turns the bag inside out, with the excrement remaining on the inside and then proceeds to throw it away in a rubbish container or something similar.

However, this operation raises a certain fussiness for many owners as the bags, generally of very thin plastic, allow the feel and the texture of the excrement to be noticed, which is somewhat unpleasant.

The waste generated has a problem that it joins an organic element, the excrement, with a non-bio-degradable element, the plastic bag, hence it is difficult to deal with said waste on a large scale.

There is the possibility of using paper, but the users are not receptive, given the weak nature of said material.

Other differing devices are also known that allow the picking up of the excrements without having to touch it, not even by a sheet of paper or plastic. These devices are generally made of a stick that at one end has two jointed pans in which there is a lining bag.

At the other end of the stick there is a handle with a lever that activates the closing action of the two pans, leaving the excrement on the inside and allowing it to be disposed of.

These devices are of a considerable size and awkward for the owner to take out when the dog goes for a walk.

In addition said pans, generally of a plastic material, are fragile and can easily break or become deformed when the stick is used for support.

DESCRIPTION OF THE INVENTION

The extendible lead with an integrated excrement collector of this invention has a series of technical peculiarities that allows for a flexible extendible dog lead, made of a handle that has a lead take up and dispensing drum on the inside through a front opening, with some means of cleanly and comfortably collecting the canine excrement for the subsequent disposal, into a single article.

In effect, the casing has some means for the fixing of the tubular bodied excrement collector, by preference on the upper part.

This tubular body has a flexible thread or similar housed longitudinally on the inside.

This flexible thread has one end emerging out of the front end of a tubular body.

This front end of the flexible thread is fixed to a side point on the outside of said end piece, for the formation of a lasso flattened by the flexible tension coming from the flexible thread.

In turn, the other end of said flexible wire comes out of the opposite end of the tubular body and connected to the handle existing in the end of some telescopic segments.

These telescopic segments are housed inside the tubular housing at the rear.

The traction on the handle of this rear part of the flexible wire allows the bag fitted by means of the front lasso to be strangled.

In this way if the bag is placed over the excrement on the ground, it gathers it up on the inside.

Subsequently the user can easily get rid of the bag with the excrement. The telescopic segments allow for a better collection of the flexible wire and its guidance when the flexible wire is advanced through the tubular body and the lasso is made bigger.

The casing has been provided with a clip on one side. This clip allows for the holding of several exchange bags prior to their use, in such a way that they are easily accessible.

The means of fixing the tubular body to the casing can be varied.

For example said means can be made up of a longitudinal channel supporting a clamp that can be opened by means of a hinge or something similar, that allows its temporary removal so as to be able to use the collector independently of the lead.

The channel defines an arrangement of the tubular body at an open angle compared to the angle that the animal lead takes.

The handle at the free end of the flexible wire that is used as a puller in order to tighten the lasso can be made by a stopper that can be fitted to the last telescopic segment of the tubular body by means of a suitable thread that traps said end of the flexible wire.

This handle allows a better finish, leaving all of the flexible wire or filament on the inside of the tubular body and the telescopic segments. In addition it means that the flexible wire can be easily changed in the event of breakage or deterioration.

In a preferred embodiment, the fixing mechanism can also have a sleeve near the tubular body, this handle being held by a clamp.

Said handle allows for the longitudinal sliding movement of the tubular body, in this way the tubular body can be positioned between a withdrawn rest position towards the rear part of the casing and an extended position when in use.

In said extended position of use the tubular body is displaced towards the front part of the casing, and so that this position is stable the tubular body has at leads a prominence at the rear end, which fits into an opening in the handle, preventing the turning of said tubular body.

In this way the fitting of the flat lasso on the ground with the opening of the bag inverted over the excrement to be picked up is easy.

The sliding handle has a locking screw on one side of the tubular body on the inside of said handle.

In this way it is possible to block the position of the tubular body and prevent the body from moving backwards during use while picking up excrements.

The bags by preference are made from recyclable paper, in this way the excrement and the bag can be thrown away together as organic waste.

DESCRIPTION OF THE FIGURES

In order to complete the description that is being made and for the purpose of providing a better understanding of the characteristics of the invention, a set of drawings is attached to this present description in which the figures being by way of illustration and are not by way of limitation of the invention, in which the following is shown.

PREFERRED EMBODIMENT OF THE INVENTION

Figure 1:
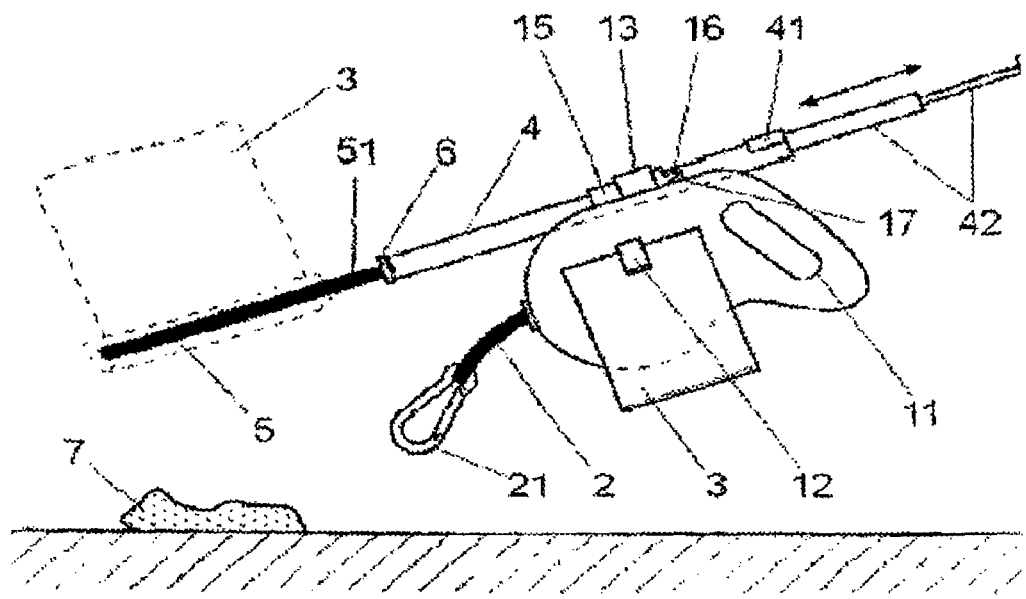
FIG. 1 shows an elevated view of the device of the new invention in use for the collection of canine excrement on the public highway.
Figure 2:
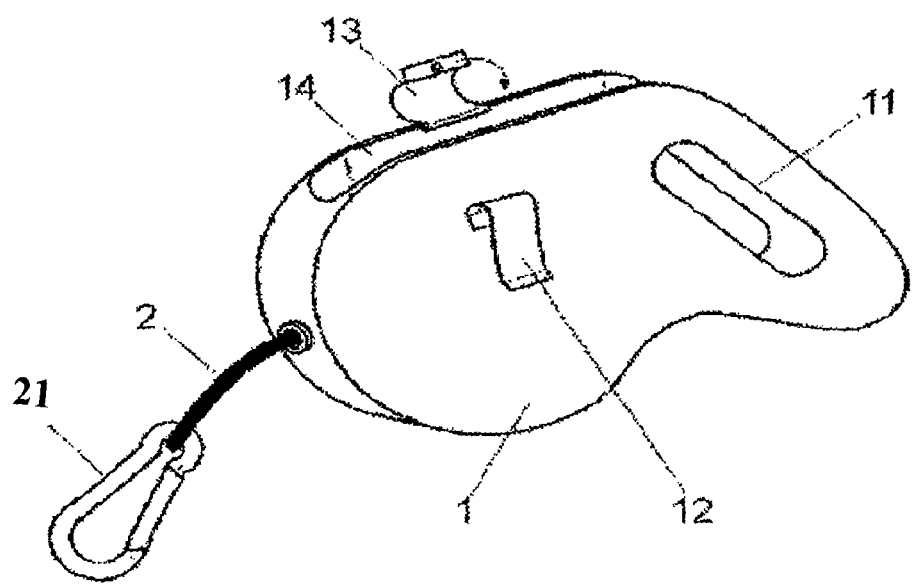
FIG. 2 shows a perspective view of the casing showing the clip and the fixing channel of the tubular body.
Figure 3:
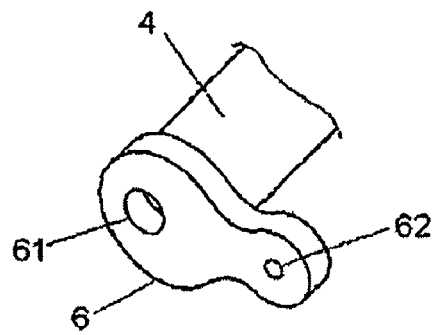
FIG. 3 shows a detailed view of the end piece in the tubular body without the flexible wire or thread that makes the forward lasso.
Figure 4:
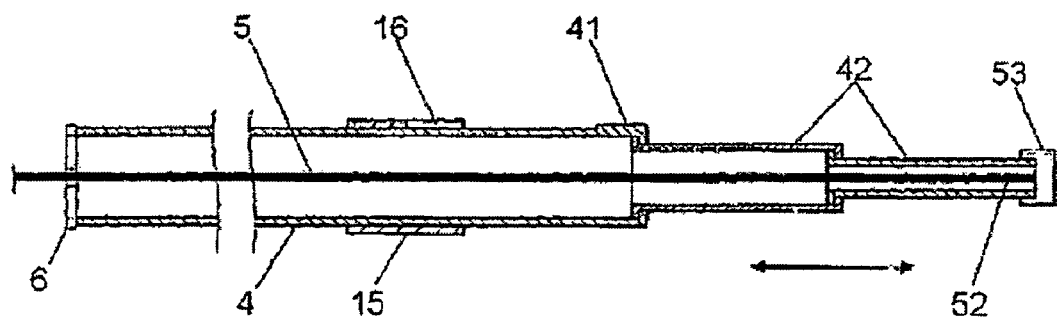
FIG. 4 shows a longitudinal view of the tubular body and the telescopic sections in which the arrangement of the flexible wire can be seen on the inside.
Figure 5:
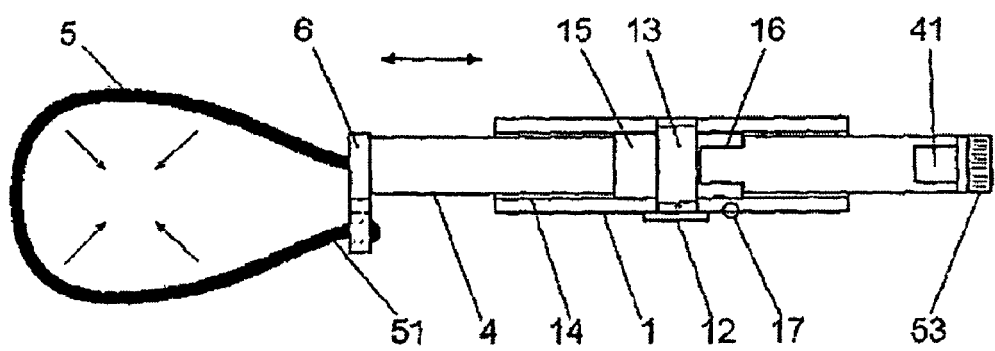
FIG. 5 shows a plan view of a lead that has a sliding and attachable tubular body, by means of which a protrusion fits into the casing handle.

As can be seen in the referred figures the present invention is made up of a casing (1) with an extendible lead (2) that includes a fitted collector of excrement in throw away bags (3). The casing (1) has a rear handle (11) with some means of collection, dispensing and locking for the inner drum (not shown) that houses the dog lead (2) by means of a snap ring (21) or a similar device that can be connected to the animal collar. The casing (1) has a clamp (12) on one side for the holding of the exchange bags (3) prior to use.

The casing (1) has some means of connection for the tubular body (4) of the excrement collector on the upper part. These means include a longitudinal channel (14) and a clamp (13) that can be opened, said clamp being fixed to one side of the channel (14) by means of a hinge and on the other side by means of a screw or similar device. This clamp (13) also allows the temporary removal of the collector from the casing (1) from the extendible lead (2). The stated channel (14) has its axis set at an open angle against the exit of the lead (2) to prevent undesirable interference and coiling up.

The tubular body (4) has a flexible thread (5) or similar housed longitudinally on the inside.

At the front end of the tubular body (4) there is an end (6) with an off-centre exit opening (61) of the forward end (51) of the stated flexible wire (5). This end (51) is joined to an external point (62) of said end (6), making a lasso that is appreciably flat and horizontal at the front part of the tubular body (4). This lasso is kept bent, approximately circular or elliptical by the tension of the wire itself (5) or filament. The other end (52) of said flexible wire (5) emerges through the rear opening of the tubular body (4), by means of some telescopic segments (42) of said tubular body (4) and held to a handle (53) at the end for the activation. The traction exercised on the handle (53) and consequently on the end (52) of the cord (5) brings about the gathering in or strangulation of the front lasso of flexible wire (5).

In the front lasso there is a bag (3) fitted that is inverted and aimed over said lasso, so that it can be placed over the excrement (7) easily in the ground and pick up said excrement (7) by means of said strangulation of the flexible lasso wire (5).

The fixing handle (53) of the free end (52) of the flexible wire (5) is finished off with a cap or knob that fits to the final telescopic section (42) of the tubular body (4) by means of a screw or something similar.

In a preferred embodiment, the fixing mechanism comprises a tube (15) trapped by a clamp (13), the tubular body (4) being housed in said tube (15) for its longitudinal slide.

This tube (15) has an opening (16) on its upper part, so that the tubular body (4) has a protrusion (41) on its rear end that fits into said opening (16).

The fit of this protrusion (41) and the opening (16) of the tube (15) allow for the positioning of the tubular body (4) appreciably in front of the casing (1) for its use, preventing the possible unwanted turn of the lasso.

The tubular body (4) is moveable backwards at rest so as not to interfere with the forward lead (2).

The sliding handle (15) has been provided with a locking screw (17) on one side of the tubular body (4) on the inside of said handle (15).

In a preferred embodiment the bags (3) are made of recyclable paper for the disposal as organic material.

Once having sufficiently described the nature of the invention, likewise having given a preferred embodiment it is placed on record that the materials, shape, size and arrangement of the elements described can be modified provided that they do not mean an alteration of the basic essentials of the invention that are claimed below.

The invention claimed is:

1. An extendible lead with an integrated excrement collector, with the lead comprising a casing with a collection drum; the excrement collector comprising a tubular body having telescopic sections and having a flexible wire inside, with one end of the wire disposed in an opening of the tubular body and forming a lasso, and a second end of the wire extending through the tubular body and out of another end of the body and connected to a handle.

2. The extendible lead of claim 1, further comprising a clamp attached to a side of the casing, the clamp being disposed to receive and retain a plurality of excrement bags before their use.

3. The extendible lead of claim 2, wherein the excrement bags are paper bags.

* * * * *